(12) United States Patent
Bornert-Dano

(10) Patent No.: US 8,469,146 B2
(45) Date of Patent: Jun. 25, 2013

(54) PANEL FOR ACOUSTIC TREATMENT COMPRISING A JUNCTION BETWEEN TWO PARTS AND PROCESS FOR THE REPARATION OF A PANEL FOR ACOUSTIC TREATMENT

(75) Inventor: Veronique Bornert-Dano, Blagnac (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 13/370,479

(22) Filed: Feb. 10, 2012

(65) Prior Publication Data

US 2012/0205192 A1 Aug. 16, 2012

(30) Foreign Application Priority Data

Feb. 10, 2011 (FR) ...................................... 11 51080

(51) Int. Cl.
*E04B 1/82* (2006.01)
(52) U.S. Cl.
USPC ............................ 181/292; 181/284; 181/290
(58) Field of Classification Search
USPC .................. 181/292, 290, 294, 284; 244/1 N
See application file for complete search history.

(56) References Cited

U.S. PATENT DOCUMENTS

| | | | | |
|---|---|---|---|---|
| 3,913,702 A * | 10/1975 | Wirt et al. | ...................... | 181/286 |
| 6,772,857 B2 * | 8/2004 | Porte et al. | ...................... | 181/210 |
| 6,827,180 B2 * | 12/2004 | Wilson | ........................... | 181/292 |
| 7,296,656 B2 * | 11/2007 | Sanicki et al. | ................. | 181/210 |
| 7,875,141 B2 * | 1/2011 | Bogue et al. | ..................... | 156/98 |
| 7,935,205 B2 * | 5/2011 | Bogue et al. | ..................... | 156/98 |
| 7,967,108 B2 * | 6/2011 | Harper | ........................... | 181/292 |
| 8,028,797 B2 * | 10/2011 | Douglas | ......................... | 181/213 |
| 2009/0188748 A1 | 7/2009 | Stevenson et al. | | |
| 2011/0315473 A1 * | 12/2011 | Fetsko et al. | ................... | 181/211 |

FOREIGN PATENT DOCUMENTS

| | | |
|---|---|---|
| EP | 1 870 228 | 12/2007 |
| FR | 2844304 | 3/2004 |
| WO | 2007/137814 | 12/2007 |

OTHER PUBLICATIONS

French Search Report dated Sep. 19, 2011, corresponding to the Foreign Priority Application No. FR 11 51080.

* cited by examiner

*Primary Examiner* — Forrest M Phillips
(74) *Attorney, Agent, or Firm* — Young & Thompson

(57) ABSTRACT

An acoustic treatment panel includes two portions with edges spaced in one direction, and from the outside to the inside, a first acoustically resistive layer, a first alveolar structure, and a reflective layer, and a block inserted between the two edges which includes, from the outside to the inside, a second acoustically resistive layer arranged at the first acoustically resistive layer and a second alveolar structure. The block includes at least one sector of alveolar structures with sloped pipes whose height is less than that of the first alveolar structure, whereby the pipes are sloped in a direction such that the ends of the pipes are close to one of the edges of the portions at the first acoustically resistive layer, and the opposite ends of the pipes are moved away from the edge and the reflective layer so as to house connecting elements between the block and the panel.

17 Claims, 2 Drawing Sheets

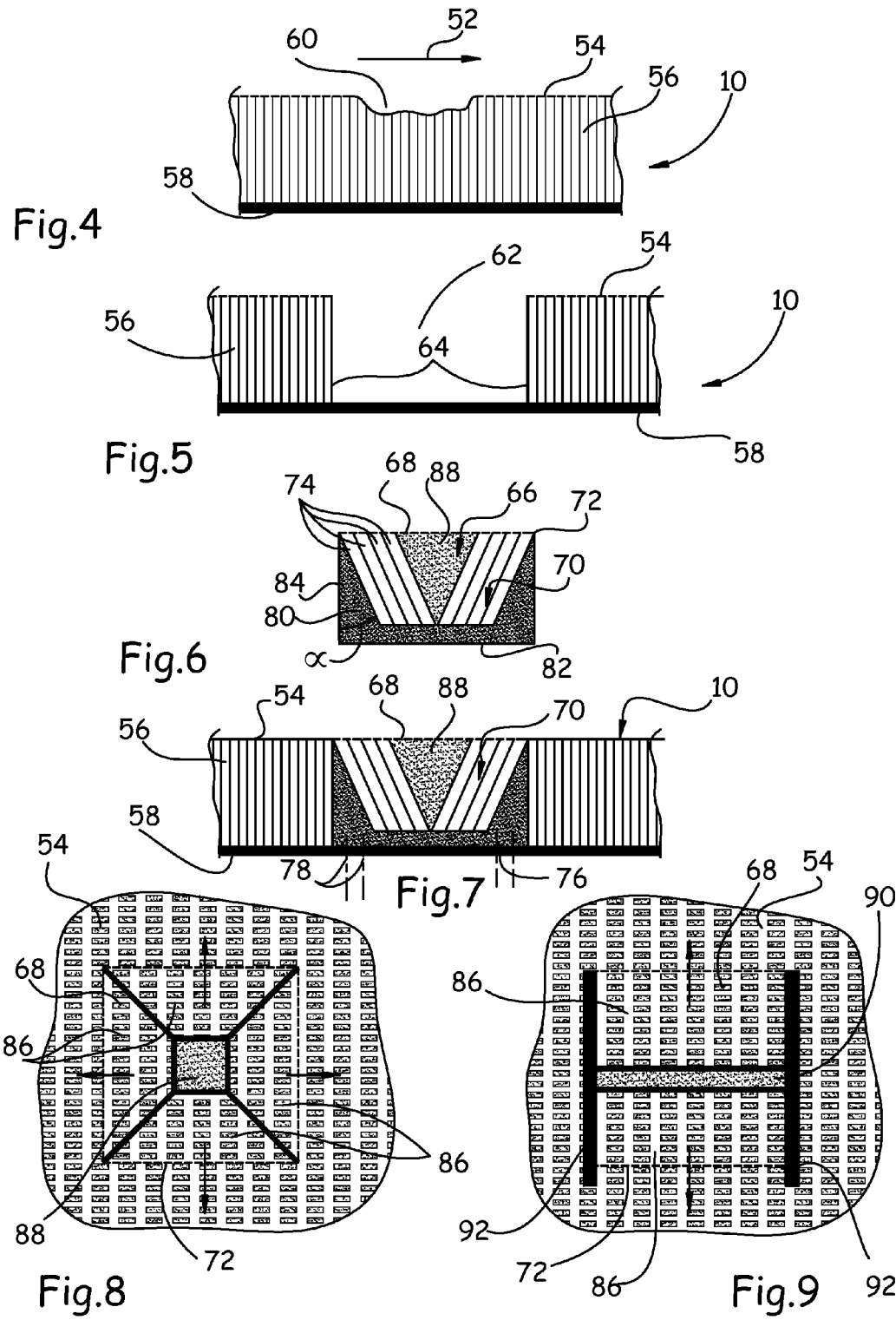

PANEL FOR ACOUSTIC TREATMENT COMPRISING A JUNCTION BETWEEN TWO PARTS AND PROCESS FOR THE REPARATION OF A PANEL FOR ACOUSTIC TREATMENT

This invention relates to an acoustic treatment panel that comprises a junction, whereby said panel is more particularly designed to be placed at a wall of an aircraft nacelle. The invention also relates to a process for repair of an acoustic treatment panel.

The noise that is emitted by an aircraft propulsion system consists of, on the one hand, jet noise, produced outside of the pipes as a result of the mixing of various air flows and exhaust gases, and, on the other hand, noise generated by the inside parts, so-called internal noise, produced by the fan, the compressors, the turbines and the combustion that propagates inside the pipes.

To limit the impact of noise pollution close to airports, the international standards are increasingly restrictive as far as sound emissions are concerned.

Techniques have been developed for reducing the internal noise, in particular by arranging, at pipe walls, panels or coverings that are intended to absorb a portion of the sound energy, in particular by using the principle of quarter-wave resonators.

Figure 1:
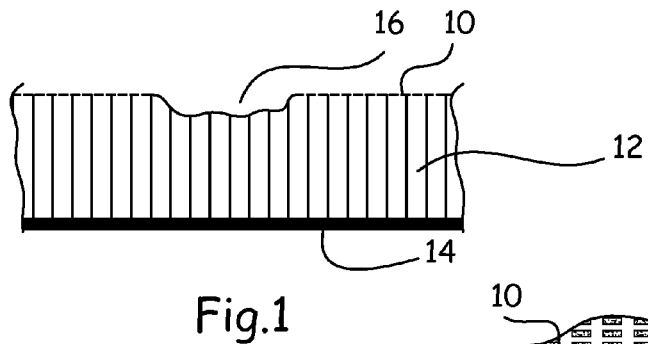

In a known manner, as illustrated in FIG. 1, an acoustic treatment panel, also called an acoustic panel or covering, comprises—from the outside to the inside—an acoustically resistive structure 10, an alveolar structure 12, and a reflective layer 14.

Layer is defined as one or more layers that may or may not be of the same type.

According to one embodiment, the reflective layer 14 can be a non-perforated sheet or plate that is made of metal or composite material.

The alveolar structure 12 can comprise a large number of juxtaposed cavities, blocked at one end by the reflective layer 14 and partially blocked at the other end by the acoustically resistive layer 10. The cavities of the alveolar structure are delimited by walls that are perpendicular to the reflective layer 14 or to the acoustically resistive layer 10, whose ends are bonded against said reflective layer 14 and the acoustically resistive layer 10.

According to one embodiment, the alveolar structure 12 comes in the form of a honeycomb that is made of metal or composite material.

The acoustically resistive structure 10 is a porous structure that plays a dissipative role, partially transforming the acoustic energy of the sound wave that passes through it into heat. It comprises so-called open zones that are able to allow acoustic waves to pass and other so-called closed or flat zones that do not allow the sound waves to pass but are designed to ensure the mechanical strength of said layer. This acoustically resistive layer is characterized in particular by an open surface ratio that varies essentially based on the engine, with components constituting said layer.

To cover a surface such as an air intake of an aircraft nacelle, several acoustic treatment panels can be juxtaposed and connected by splice plates. These splice plates do not have an acoustic function and should have an adequate width for obtaining a structure that has adequate mechanical characteristics. This assembly method does not make it possible to obtain an optimized acoustic treatment to the extent that the open surface ratio is not homogeneous over the entire surface because of the presence of splice plates.

To optimize the acoustic treatment, the applicant developed a particular technique called "O-splice plate," described in the documents FR-2,844,304 or U.S. Pat. No. 6,772,857. According to this technique, the acoustically resistive layer consists of a large number of strips arranged in the direction of flow of the streams and connected to one another by a large number of splice plates ensuring the uptake of forces and having a reduced width relative to the width of the strips in such a way as to ensure the continuity of the homogeneous nature of the open surface ratio.

In FIG. 1, an acoustic treatment panel was shown whose surface that is in contact with the stream of air is damaged and comprises a concave deformation 16 because of, for example, an accidental impact during flight (bird, ice, . . . ) or during maintenance (dropped tools, . . . ).

This concave deformation 16 tends to produce aerodynamic disturbances at the flow of the air stream that is in contact with said panel, to alter the acoustic treatment, and it can reduce the structural strength of the panel. Also, it is necessary to repair the panel to at least limit the aerodynamic disturbances.

Figure 2A:
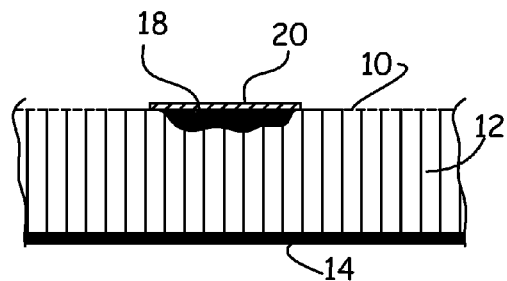
Figure 2B:
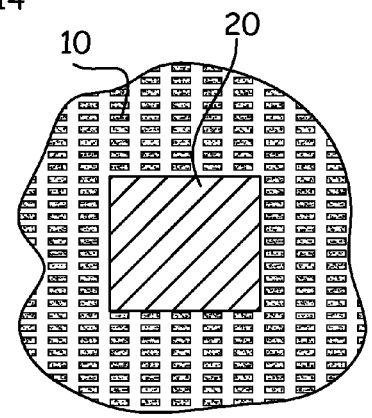

According to a first operating procedure that is described in FIGS. 2A and 2B, a resin 18 is injected into the damaged cells or pipes of the alveolar structure in such a way as to fill the concave deformation, and then a front plate 20 that covers the resin 18 and that extends beyond the damaged zone is optionally arranged on the damaged zone in such a way as to be connected by gluing, riveting, etc., with the acoustically resistive layer 10.

This front plate can be metal or composite material.

Figure 3A:
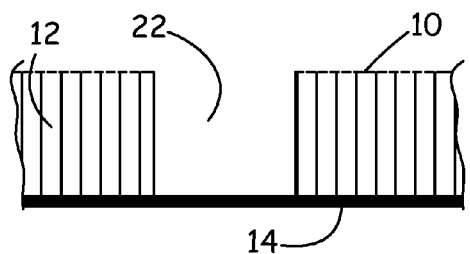
Figure 3B:
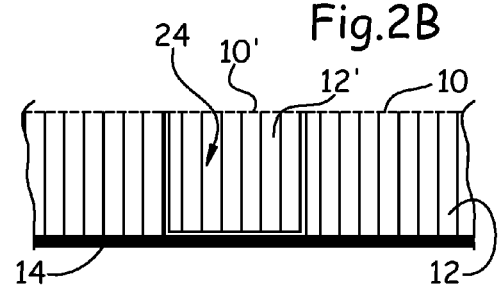

As illustrated in FIG. 3B, the front plate 20 is a flat surface and consequently has a zero open surface ratio although at the covered zone, the acoustic treatment is completely eliminated.

The object of another operating procedure described in FIGS. 3A to 3D is to limit the impact of the repair on the acoustic treatment. According to this operating procedure, the alveolar structure 12 and the acoustically resistive layer 10 are removed at the concave deformation 16 in such a way as to obtain a recess 22 that is delimited by edges perpendicular to the reflective layer 14, as illustrated in FIG. 3A.

A block 24 is cut out with shapes that are adapted to the recess 22, whereby this block comprises an alveolar structure 12' that is covered by an acoustically resistive layer 10', with said shapes being identical to the alveolar structure 12 and the acoustically resistive layer 10 of the acoustic treatment panel to be repaired. This block 24 is introduced into the recess 22, as illustrated in FIG. 3B.

Figure 3C:
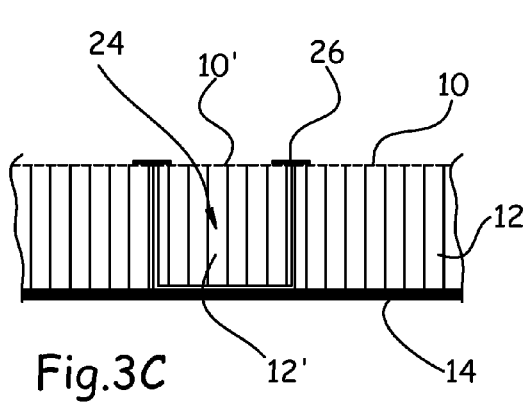

To ensure the connection between the block 24 and the rest of the panel for the acoustic treatment, a splice plate 26 is used at the border separating the block 24 and the rest of the panel, arranged astride said border and connected to the block 24 and to the rest of the panel by gluing, riveting, etc., as illustrated in FIG. 3C. This splice plate 26 can come in the form of folds embedded in a resin.

Like the front plate 20 of the first operating procedure, the splice plate 26 has a zero open surface ratio although at the zone that is covered by said splice plate 26, the acoustic treatment is completely eliminated. Contrary to the first operating procedure, the latter limits the impact of the repair on the acoustic treatment to the extent that the surface of the block 24 that is not covered by the splice plate 26 ensures an acoustic treatment.

Thus, the known repair operating procedures all lead to losses of surfaces treated on the acoustic level and produce discontinuities in the acoustic treatment.

This invention proposes an acoustic treatment panel with a junction zone that limits the discontinuities in the acoustic treatment.

For this purpose, the invention has as its object an acoustic treatment panel that comprises, on the one hand, at least two portions with edges that are spaced in at least one direction and with—from the outside to the inside—an acoustically resistive layer, at least one alveolar structure, and a reflective layer, and, on the other hand, a block that is inserted between the two edges that comprise—from the outside to the inside—an acoustically resistive layer that is arranged at said acoustically resistive layer of the two portions and at least one alveolar structure, characterized in that the block comprises at least one sector of alveolar structures with sloped pipes whose height h is less than the height H of the alveolar structure of the panel for the acoustic treatment, whereby said pipes are sloped in a direction such that the ends of the pipes are close to one of the edges of the portions at the acoustically resistive layer, and the opposite ends of said pipes are moved away from said edge and the reflective layer of the two portions in such a way as to house connecting means between said block and said panel.

According to another objective, the invention proposes a process for repair of an acoustic treatment panel whose purpose is to limit the impact of said repair on the acoustic treatment.

Figure 3D:
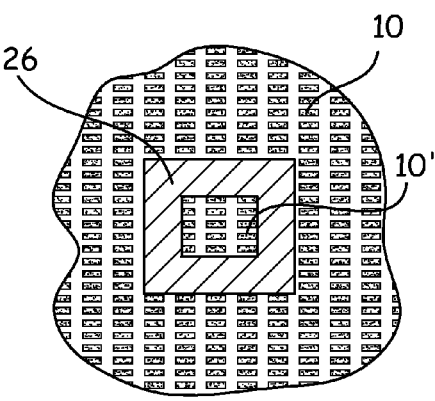

Other characteristics and advantages will emerge from the following description of the invention, a description that is provided only by way of example, relative to the accompanying drawings in which:

FIG. 1 is a cutaway that illustrates a damaged acoustic treatment panel,

FIG. 2A is a cutaway that illustrates a repaired acoustic treatment panel according to a first operating procedure of the prior art, FIG. 2B is a top view of the acoustic treatment panel of FIG. 2A, FIGS. 3A to 3C are cutaways that illustrate the different stages of a second operating procedure for repair of an acoustic treatment panel according to the prior art, FIG. 3D is a top view of the acoustic treatment panel of FIG. 3C, FIG. 4 is a cutaway that illustrates a damaged acoustic treatment panel, FIGS. 5 to 7 are cutaways that illustrate the different stages of the repair process according to the invention of an acoustic treatment panel according to the invention, FIG. 8 is a top view that illustrates a repaired acoustic treatment panel according to a first variant of the repair process according to the invention, and FIG. 9 is a top view that illustrates a repaired acoustic treatment panel according to a first variant of the repair process according to the invention.

FIG. 4 shows in a cutaway an acoustic treatment panel 50 whose so-called aerodynamic surface can be in contact with an air stream referenced by the arrow 52.

This acoustic treatment panel comprises—from the outside to the inside—an acoustically resistive layer 54 of which one surface is in contact with the air stream 52, at least one alveolar structure 56, and a reflective layer 58.

By way of example, an acoustic treatment panel can be arranged in a pipe of an aircraft nacelle.

According to the applications, the acoustic treatment panel can comprise several superposed alveolar structures 56 that are separated by an acoustically resistive layer.

Layer is defined as one or more layers that may or may not be of the same type.

According to one embodiment, the reflective layer 58 can be a non-perforated sheet or plate that is made of metal or composite material.

The alveolar structure 56 can comprise a large number of juxtaposed pipes that are blocked or partially blocked at each end. Each pipe is delimited by at least one wall that is essentially perpendicular to the reflective layer 58 and/or to the acoustically resistive layer 54. Thus, the alveolar structure 56 comprises straight pipes.

According to one embodiment, the alveolar structure 56 comes in the form of a honeycomb that is made of metal or composite material.

However, the invention is not limited to these embodiments for the reflective layer and the alveolar structure.

According to the variants, the acoustically resistive layer 54 can comprise a layer or several layers that are mounted adjacent to one another.

According to one embodiment, the acoustically resistive layer 54 comes in the form of a plate with openings.

According to another variant, the acoustically resistive layer 54 comprises at least one porous layer and at least one reinforcement structure. In this case, the porous layer is a metal material, in particular a stainless steel mesh that is known to one skilled in the art. The reinforcement structure is a plate with openings. According to all of the variants, the acoustically resistive layer 54 comprises openings that make it possible to link the zones that are arranged on both sides of said acoustically resistive layer 54.

According to an embodiment that is described in the documents FR-2,844,304 or U.S. Pat. No. 6,772,857, the acoustically resistive layer 54 consists of a large number of strips arranged in the direction of flow of the streams and connected to one another by a large number of splice plates ensuring the uptake of forces and having a reduced width relative to the width of the strips in such a way as to ensure the continuity of the homogeneous nature of the open surface ratio.

This acoustic treatment panel 50 may be damaged and may comprise a concave deformation 60 because of, for example, an accidental impact during flight (bird, ice, . . . ) or during maintenance (dropped tools, . . . ).

The repair process comprises a first stage that is described in FIG. 5, consisting in removing a portion of the alveolar structure 56 and the acoustically resistive layer 56 at the concave deformation 60 in such a way as to obtain a recess 62 that is delimited by at least one side wall 64 that is essentially perpendicular to the reflective layer 58 and/or the acoustically resistive layer 54.

The second stage that is illustrated in FIG. 6 consists in producing a block 66 that comprises—from the outside to the inside—an acoustically resistive structure 68 that defines a front surface and at least one alveolar structure 70. The front face of the block 66 has a contour 72 whose shapes are adapted to those of the recess 62 when the acoustically resistive layer 68 of the block 66 is arranged at the acoustically resistive layer 54 of the panel 50.

Thus, the side wall 64 and the contour 72 form a junction zone between two acoustic treatment panels, namely between the acoustic treatment panel 50 that is to be repaired and the one that is formed by the connected block 66.

According to the invention, the alveolar structure 70 of the block 66 comprises sloped pipes 74, whose height h is less than the height H of the alveolar structure 56 of the acoustic treatment panel.

The pipes 74 are sloped in such a way that, over at least a portion of the contour of the recess 62, said pipes are contiguous with the side wall 64 of the recess 62 at the acoustically resistive layer 54 and moved away from the side wall 64 of the recess 62 close to the reflective layer 58. This slope makes it possible to obtain a so-called junction space 76 between, on the one hand, the alveolar structure 70 of the block, and, on the other hand, the alveolar structure 56 and the reflective layer 58 of the acoustic treatment panel 50.

The sloped pipes 74 provide the same acoustic response as the straight pipes while being lower in height, and the junction space 76 makes it possible to house connecting means 78 between the connected block 66 and the acoustic treatment panel 50.

To limit the impact of repair on the acoustic treatment, the play between the contour 72 and the side wall 64 of the recess is to be the smallest possible. Preferably, the sloped pipes 74 are blocked at their ends opposite to the acoustically resistive layer 68.

According to one embodiment, the block 66 can comprise a reflective layer that is flattened against the surface of the alveolar structure opposite to the one against which the acoustically resistive layer is applied.

According to another embodiment that is illustrated in FIGS. 6 and 7, the block 66 comprises a packing structure 80 that is made integral with the alveolar structure 70 whose outside shapes are adapted to those of the recess 62 and that blocks the pipes 74 at their ends that are opposite to the acoustically resistive layer 68. Thus, the block 66 comprises a rear surface 82 that can be flattened against the reflective layer 58 and at least one side wall 84 that can be mounted adjacent to the side wall 64 of the recess 62 when the block 66 is installed.

Advantageously, the block 66 is attached to the reflective layer 58 using connecting means 78 such as gluing, riveting, etc., for example.

Advantageously, the pipes 74 of the alveolar structure 70 have cross-sections that are similar to those of the straight pipes of the alveolar structure of the panel 50. However, the cross-sections could be different but impart the same response on the acoustic level.

Advantageously, the pipes form a non-zero angle to the normal to the acoustically resistive layer that varies on the order of 10 to 30°.

Preferably, the pipes form an angle α to the normal to the acoustically resistive layer on the order of 30°.

According to a first variant that is illustrated in FIG. 8, the block 66 can comprise several sectors 86 of alveolar structures, each sector having a suitable slope direction that is oriented in such a way that the ends of the pipes that are oriented in the direction of the reflective layer 58 are directed toward the center of the block.

In the case of a rectangular or square recess 62, the block 66 comprises four sectors 86 that are delimited by the diagonals of the square or rectangle with a hollow pyramidal shape 88 in the central part under the acoustically resistive layer 68. Even if it does not offer the same response on the acoustic level as the sloped pipes 74, this hollow central shape 88 is active on the acoustic treatment level.

According to another variant that is illustrated in FIG. 9, the block 66 comprises two sectors of alveolar structures, with the two sectors having opposite slope directions, the ends of the sloped pipes 74 of the first sector being oriented in a first direction and the ends of the sloped pipes 74 of the second sector being oriented in a second direction that is opposite to the first.

In this case, the block 66 comprises a hollow central shape 90 that extends perpendicularly to the inclination plane with a triangular cross-section. According to this variant, the junction zones that are perpendicular to the inclination plane can be reinforced with splice plates 92. Even in this case, the surface area that is covered by the splice plates 92 is smaller than the one that is covered by the necessary splice plates according to the repair processes of the prior art.

Preferably, the block 66 comprises at least two sectors, with the slope directions of the pipes of the two sectors being convergent in the direction of the reflective layer 58.

By way of comparison, for a square repair zone of 200 mm on one side with a height H of 35 mm, if the first operating procedure of the prior art that is described by FIGS. 2A and 2B is used, the surface of the front plate 20 that is not active on the acoustic level is on the order of 53,000 mm$^2$.

If the second operating procedure of the prior art that is described by FIGS. 3A to 3D is used, the non-active surface that is covered by the splice plates 26 on the acoustic level is on the order of 28,000 mm$^2$.

If a block 66 with four sectors with pipes sloped at 30° is used, the surface that emerges from the concave central shape 88 (acoustically active but not homogeneous with the rest of the pipes) is on the order of 1,225 mm$^2$.

The invention is not limited to the application described above.

Thus, the invention can be used to ensure the connection between two portions of the same acoustic panel or between two acoustic treatment panels. Thus, a block can be inserted between the straight edges of the two acoustic treatment panels, with the block comprising two edges, a first edge that is mounted adjacent to the edge of the first panel and a second edge that is mounted adjacent to the edge of the second panel. To limit the impact on the acoustic level of the junction between the two panels, the block comprises, on the one hand, at the first edge, a first sector of pipes that are sloped in a first direction in such a way that the ends of the pipes arranged at the acoustically resistive layer are close to the first edge and the opposite ends of said pipes are removed from the first edge, and, on the other hand, at the second edge, a second sector of pipes that are sloped in a second direction in such a way that the ends of the pipes arranged at the acoustically resistive layer are close to the second edge, and the opposite ends of said pipes are moved away from the second edge.

In all of the cases, the invention makes it possible to ensure acoustic continuity between at least two portions of alveolar structures with edges spaced in at least one direction, and it consists in using a block that comprises at least one sector of alveolar structures with pipes that are sloped in a direction in such a way that the ends of the pipes are close to one of the edges of the portions of alveolar structures at the acoustically resistive layer and the opposite ends of said pipes are moved away from said edge.

The invention claimed is:

1. An acoustic treatment panel comprising:
   at least two portions with edges (64) that are spaced in at least one direction and with, from outside to inside, a first acoustically resistive layer (54), at least one first alveolar structure (56), and a reflective layer (58), and,
   a block (66) that is inserted between the two edges (64) that comprises, from the outside to the inside, a second acoustically resistive layer (68) that connects to said first acoustically resistive layer (54) of the two portions (56) and at least one alveolar second structure (70),
   wherein the block (66) further comprises at least one sector of alveolar structures with sloped pipes (74), the sloped pipes (74) having a first height less than a second height of the first alveolar structure (56),
   wherein said sloped pipes (74) are sloped in a direction such that first ends of the sloped pipes are close to one of the edges of the portions at the first acoustically resistive layer (54), and opposite second ends of said sloped pipes are moved away from said one of the edges and the reflective layer (58) of the two portions in such a way as to house connecting means between said block (66) and said panel.

2. The acoustic treatment panel according to claim 1, wherein the sloped pipes (74) form a non-zero angle to a normal to the second acoustically resistive layer within a range of 10 to 30°.

3. The acoustic treatment panel according to claim 2, wherein the sloped pipes (74) form an angle α to the normal to the second acoustically resistive layer on the order of 30°.

4. The acoustic treatment panel according to claim 1:
wherein the block (66) comprises several sectors (86) of alveolar structures,
wherein each sector has a suitable slope direction such that the opposite second ends of the sloped pipes that are oriented in the direction of the reflective layer (58) are directed toward a center of the block, with the block having a hollow shape (88, 90) in a central part under the second acoustically resistive layer (68).

5. The acoustic treatment panel according to claim 4:
wherein the block (66) comprises two sectors of alveolar structures, with the two sectors having opposite slope directions,
wherein the opposite second ends of the sloped pipes (74) of a first sector of the two sectors are oriented in a first direction and the opposite second ends of the sloped pipes (74) of a second sector of the two sectors are oriented in a second direction that is opposite to the first.

6. The acoustic treatment panel according to claim 1, wherein the block (66) comprises a packing structure (80) that is made integral with the alveolar second structure (70) with a rear surface (82) that can be flattened against the reflective layer (58) of the panel and at least one side wall (84) that can be mounted adjacent to the edges (64).

7. A process for repair of an acoustic treatment panel that comprises, from outside to inside, a first acoustically resistive layer (54), at least one first alveolar structure (56), and a reflective layer (58), the process comprising,
removing a portion of the first alveolar structure (56) and the first acoustically resistive layer (56) in such a way as to obtain a recess (62) that is delimited by at least one side wall (64) that is essentially perpendicular to the reflective layer (58) and/or to the acoustically resistive layer (54),
producing a block (66) that comprises, from the outside to the inside, a second acoustically resistive structure (68) that defines a front surface and at least one second alveolar structure (70), with the front surface of the block (66) having a contour (72) whose shapes are adapted to those of the recess (62) when the second acoustically resistive layer (68) of the block (66) is connected to the first acoustically resistive layer (54), and
placing said block (66) in said recess (62), wherein the second alveolar structure (70) of the block (66) comprises sloped pipes (74) having a first height less than a second height of the first alveolar structure (56),
wherein the sloped pipes (74) are sloped in such a way that, over at least a portion of the contour of the recess (62), said sloped pipes are contiguous with the side wall (64) of the recess (62) at the acoustically resistive layer (54) and are moved away from the side wall (64) of the recess (62) close to the reflective layer (58).

8. The process for repair of an acoustic treatment panel according to claim 7, wherein the sloped pipes (74) form a non-zero angle to a normal to the second acoustically resistive layer within a range of 10 to 30°.

9. The process for repair of an acoustic treatment panel according to claim 8, wherein the sloped pipes (74) form an angle α to the normal to the second acoustically resistive layer on the order of 30°.

10. The process for repair of an acoustic treatment panel according to claim 7, wherein the block (66) comprises several sectors (86) of alveolar structures, each sector having a suitable slope direction such that the opposite second ends of the pipes that are oriented in the direction of the reflective layer (58) are directed toward a center of the block, with the block having a hollow shape (88, 90) in a central part under the second acoustically resistive layer (68).

11. The process for repair of an acoustic treatment panel according to claim 10:
wherein the recess (62) is a rectangular or square recess (62),
wherein the block (66) comprises four sectors (86) that are delimited by diagonals of the square or rectangular recess with a hollow pyramidal shape (88) in the central part under the acoustically resistive layer (68).

12. The process for repair of an acoustic treatment panel according to claim 7, wherein the block (66) comprises a packing structure (80) that is made integral with the second alveolar structure (70) with a rear surface (82) that can be flattened against the reflective layer (58) and at least one side wall (84) that can be mounted adjacent to the edges (64).

13. The process for repair of an acoustic treatment panel according to claim 8, wherein the block (66) comprises several sectors (86) of alveolar structures, each sector having a suitable slope direction such that the opposite second ends of the pipes that are oriented in the direction of the reflective layer (58) are directed toward a center of the block, with the block having a hollow shape (88, 90) in a central part under the second acoustically resistive layer (68).

14. The process for repair of an acoustic treatment panel according to claim 9, wherein the block (66) comprises several sectors (86) of alveolar structures, each sector having a suitable slope direction such that the opposite second ends of the pipes that are oriented in the direction of the reflective layer (58) are directed toward a center of the block, with the block having a hollow shape (88, 90) in a central part under the second acoustically resistive layer (68).

15. The acoustic treatment panel according to claim 2:
wherein the block (66) comprises several sectors (86) of alveolar structures,
wherein each sector has a suitable slope direction such that the opposite second ends of the sloped pipes that are oriented in the direction of the reflective layer (58) are directed toward a center of the block, with the block having a hollow shape (88, 90) in a central part under the second acoustically resistive layer (68).

16. The acoustic treatment panel according to claim 3:
wherein the block (66) comprises several sectors (86) of alveolar structures,
wherein each sector has a suitable slope direction such that the opposite second ends of the sloped pipes that are oriented in the direction of the reflective layer (58) are directed toward a center of the block, with the block having a hollow shape (88, 90) in a central part under the second acoustically resistive layer (68).

17. An acoustic treatment panel comprising:
a reflective layer (58);
two primary alveolar structures (56) connected to a surface of the reflective layer (58);
two primary acoustically resistive layers (54) connected to each of the two primary alveolar structures (56); and a block (66) connected to the surface of the reflective layer (58) between the two primary alveolar structures (56) and the two primary acoustically resistive layers (54);

wherein the block includes a secondary acoustically resistive layer (68) connected to and disposed between the two primary acoustically resistive layers (54);

wherein the block includes a secondary alveolar structure disposed between the two primary alveolar structures (56);

wherein the secondary alveolar structure includes a sector of sloped pipes (74) having a first height less than a second height of the two primary alveolar structures;

wherein the sloped pipes (74) are non parallel with vertical pipes of the two primary alveolar structures.

* * * * *